United States Patent [19]

Glander et al.

[11] 4,289,860
[45] Sep. 15, 1981

[54] GRAFTING OF SILANE ON THERMOPLASTICS OR ELASTOMERS FOR PURPOSES OF CROSS LINKING

[75] Inventors: Fritz Glander, Isernhagen; Hermann U. Voigt, Langenhagen, both of Fed. Rep. of Germany

[73] Assignee: Kabel- und Metallwerke Gutehoffnungshütte AG, Hanover, Fed. Rep. of Germany

[21] Appl. No.: 557,108

[22] Filed: Mar. 10, 1975

[30] Foreign Application Priority Data

Mar. 8, 1974 [DE] Fed. Rep. of Germany ....... 2411141
Aug. 17, 1974 [DE] Fed. Rep. of Germany ....... 2439513
Aug. 17, 1974 [DE] Fed. Rep. of Germany ....... 2439534

[51] Int. Cl.³ .......................................... C08F 255/02
[52] U.S. Cl. ............................. 525/263; 204/159.13; 525/288

[58] Field of Search .................. 260/827; 204/159.13; 525/263, 288

[56] References Cited

U.S. PATENT DOCUMENTS 3,646,155  2/1972  Scott ................................ 260/827
3,830,872  8/1974  Schrage et al. .................. 260/827

Primary Examiner—Wilbert J. Briggs, Sr.

[57] ABSTRACT

Granulated polyethylene is agitated and mixed with a solution of silane with peroxide, activators and anti-oxidants and at a temperature between 80° to 100° C. to obtain diffusion of these additives into the polyethylene particles which is followed by grafting through extrusion or radiation which in turn is followed by exposure to and/or development of water to obtain cross-linking. A catalyst is added preferably by mixing polyethylene powder with the catalyst and adding that powder to the powder with diffused silane, after that diffusion has been completed.

35 Claims, 1 Drawing Figure

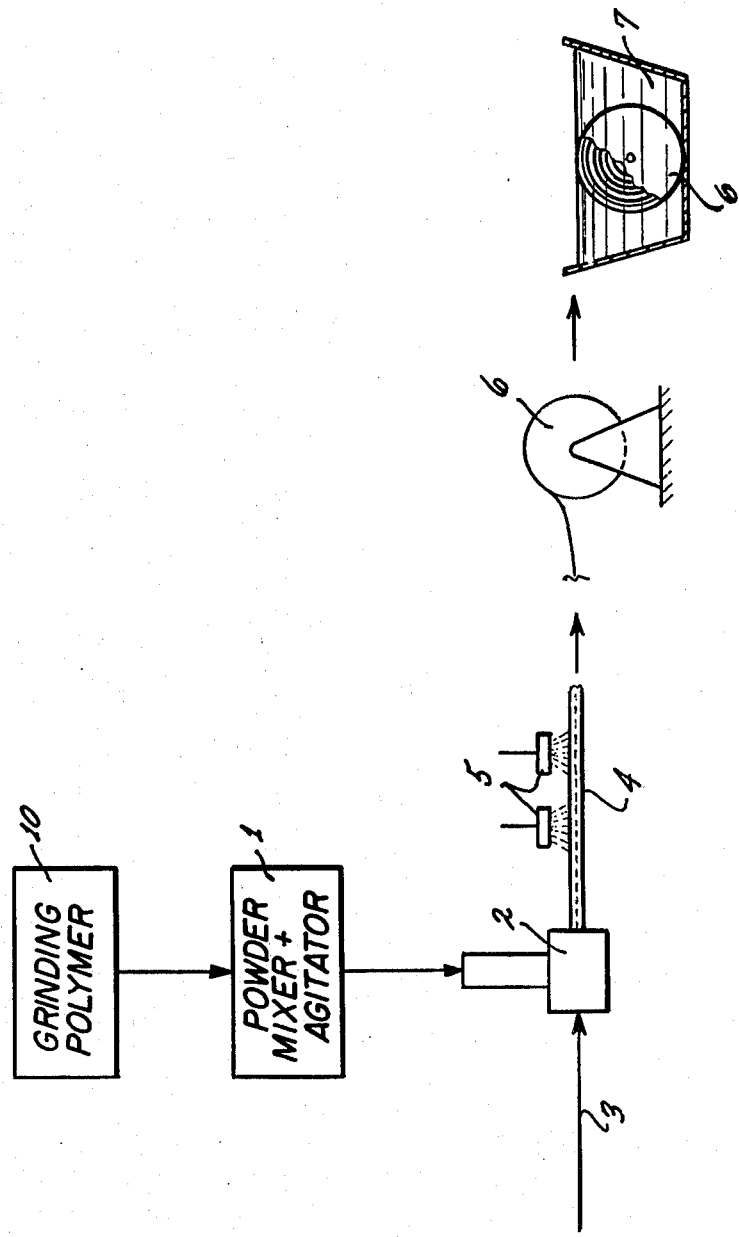

GRAFTING OF SILANE ON THERMOPLASTICS OR ELASTOMERS FOR PURPOSES OF CROSS LINKING

BACKGROUND OF THE INVENTION

The present invention relates to the grafting of polymers for purposes of obtaining cross-linked thermoplastics or elastomers, and more particularly the invention relates to grafting a silane compound upon the not yet cross-linked molecules of a polymer to obtain later cross-linking in the presence of moisture. Thus, the invention relates to the preparation of plastic or elastomeric material for subsequently obtaining cross-linking, the preparation being the grafting of silane upon the polymer. The plastic material so treated is to include olefinepolymerizates or olefine-mixed polymerizates and others, preferably polyethylene, and to be uased as jacket, envelope or cover for elongated material such as electrical cable, conductors or tubes, etc.

The German printed patent application DAS No. 1,794 028 discloses grafting alkoxy-silane components on organic polymerizates with subsequent curing in the presence of moisture to obtain cross-linking. An alkoxy-silane compound may have the structure $R\ Si\ Y_3$ wherein R is a vinyl group or a gammamethacrylperoxipropyl group, and Y is an alkoxy group with less than six carbon atoms.

Particularly, this printed patent application discloses grafting of trimethoxy-vinyl-silane or triethoxy-vinyl-silane or other functionally organic silanes on polyethylene macromolecule. The grafting of the silane compound is specifically obtained pursuant to extrusion in the presence of additives, which provide for suitable radicals such as peroxides, whereby the grafting requires rather high temperatures, such as from 180° C. to 220° C. Prior to extrusion, silane and peroxide are mixed with granulated polyethylene. In fact, the polyethylene particles are surface coated with the liquidous mixture of silane and peroxide. Homogenization is produced later in the extruder, which also performs the grafting. The resulting product is granulated again, and the grafted, granulated copolymer is blended with polyethylene in a polyethylene batch which contains also a catalyst for cross-linking. The resulting final product is then form extruded e.g. it is extruded as a jacket around a cable, a tube or the like.

This known method has the disadvantage that the usual extruders produce local premature, cross-linking due to non-homogeneous peroxide distribution. The formation of such gel particles is particularly disadvantageous when the resulting product is to serve as electrical insulation. Thus, grafting will be carried out properly only if the temperature profile in the barrel of the extrusion process is adequately predetermined and controlled so that grafting proper occurs only after the materials have been homogenized sufficiently.

As stated, the coating of the granules introduces some inherent inhomogeneities in the distribution of peroxide, and premature cross-linking during cooling of the granulated grafting component is detrimental to this process. Therefore, cable insulation cannot readily be made in that manner particularly in those cases where electrical and mechanical properties are critical. The outline of the process above indicates further that a multiple of separate steps have to be performed which complicates the process. Also, the grafted but not yet cross-linked plastic can be stored only to a limited extent and for a limited duration as any moisture will start the cross-linking. It is apparent, however, that cross-linking should begin only after the plastic has assumed and has been given its final shape.

Another disadvantage of the known procedure is to be seen in that after the catalyst has been added (the grafting component was added earlier) extrusion becomes more complicated as long as even traces of moisture are present in the material. As a consequence, the surface of the product is quite rough which is a significant deficiency if the product is subjected to an electric field and voltage.

DESCRIPTION OF THE INVENTION

It is an object of the present invention to provide a new and improved method of grafting a silane compound upon thermoplastic or elastomeric material to permit such material to cross-link in the presence of moisture while avoiding the problems and interferences outlined above.

In accordance with the preferred embodiment of the present invention, it is suggested to provide the thermoplastic or elastomer as dry, fluid power which is agitated for internal, rapid, high speed, turbulent movement. Silane or silane compounds and other additives, all in liquid form, are added to that powder before and-/or during the fluidization while subjecting the powder to a higher-than-normal temperature, but below the crystallite melting range (e.g. in the range from 60° to 100° C.) so that the additives diffuse at least partially into the surface of the fluid-particles to be distributed therein as homogeneously as possible. The thus treated material does not loose its character as a fluidizable powder. That powder is subsequently subjected to steps by means of which grafting is obtained. It should be mentioned, that the term powder is used here in the general sense and is to include also grit like material and material of granulated consistency.

It can thus be seen, that prior to the final shaping extrusion, separate extrusion for grafting and subsequent granulation is not necessary; the material never looses its powdery, fluidizable consistency. This is clearly simpler and more practicable.

The additives themselves are homogenized prior to the mixing with the fluidized or fluidizable powder. These additives are the silane and/or silane compounds as used for grafting; free radical initiators such as peroxides; poly-functional monomers as activators such as e.g. triallyl cyanurate, divinyl benzene, ethylene dimethylcrylate, triallylphosphite and others; condensation catalysts such as dibutyltindilaurate or heavy metal salts of long chain fatty acids may be included at that point or added later. These materials are mixed, at least in parts, prior to being added to the powdery thermoplastic or elastomeric material. The latter powder should be predried to prevent premature cross-linking, so as to improve the quality of the product. The thermoplastic or elastomeric material could be (preferably) polythylene or a copolymerizate of ethylene with another co-monomer such as ethylene-vinylacetate; propylene; butylene, etc.

The grafting proper can be obtained in various ways. By way of example, the silane or silane compound can be grafted on the macromolecules of the polyethylene under mechanical-thermal treatment e.g. while being formshaped in an extruder. The treatment requires temperatures between 160° and 250° C.; that range depends essentially on the decomposition kinetics of the particular additives that is to furnish the active radicals. Also, dwell time in and throughout of the extruder are factors which determine the operating temperature.

Alternatively, grafting may be obtained by subjecting the powder with diffused additives to high energy radiation. Peroxide is not needed here as an additive and the quality of the resulting product is even higher. The melting temperature may be less than usual, e.g. below 180° C. so that the entire thermal operating range to which the material is subjected is lower. By way of example, one may use here a Van-de-Graaf accelerator emitting electrons at a doses of 0.1 to 3 Mrd, after having extruded the material into the desired shape. This was particularly used as an alternative for thermal grafting in the Example II (infra).

It may be advisable to include among the additives an anti-oxidant for thermal stabilization. This is particularly advantageous if the anti-oxidant is of the variety which influences very little the reaction involving the radicals. Rather, they are included in the grafting and are being grafted on the polymer macromolecules.

In the preferred form of practicing the invention the condensation catalyst will be added after the silane plus additives have diffused into the particles of the fluidizable polymer. By way of example, a batch is prepared of the same granulated powdery polymer and mixed with the condensation catalyst. That batch is then added to the fluidized polymer in the last phase of agitation or in the initial, charge phase of subsequent extrusion. Alternatively, the catalyst can be sprayed into the extruded substance or onto the extruded product.

It is another feature of the invention to use an additive which release water e.g. at high temperature so that the cross-linking in the presence of moisture results from the internal development of water.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows schematically the carrying out of the process in accordance with the preferred embodiment.

Reference numeral 1 denotes a high speed mixer being, for example, a vessel in which cutters, blades, vanes or the like rotate at high speed, such as 500 to 3000 RPM. Polyethylene if used as starting material is charged to that mixer. Reference numeral 10 denotes a grinding and predrying stage so that the material when charged is in a fluidizable state. Thus, the polyethylene as used is in a powdery or granular state. The mixer vessel itself is evacuated so that in fact residual moisture is removed. The evacuation may in fact suffice for drying.

The mixing speed is selected in accordance with the mesh size of the particles. While nothing precludes the application of external heat, it was found to be sufficient to run the high speed agitator at such an intensity that particle collision and friction actually suffices to heat the fluidized powder and granulated polymers. Since the surface of the individual particles may begin to soften, agitation is still continued, though possibly at a reduced rate but sufficient to prevent agglomeration caking and clustering of particles.

The purpose of softening and melting the particle surface is to enhance the later ensuing diffusion and to increase the diffusion rate. Since the diffusion is the principle purpose of agitation, raising the temperature is quite important. High speed agitation may not suffice so that additional heating may be needed. The agitation of course will be highly instrumental in rapidly equalizing the temperature throughout the fluid material so that thermal conduction occurs only from particle to particle and inside of each particle, but the mixer-induced turbulence equalizes the temperature in and throughout the vessel.

As high speed agitation and fluidization takes place the needed additives e.g. silane and peroxide and other additives are fed to the mixer. These additives are in the liquid state, but due to the evacuation a considerable portion will evaporate immediately so that only little liquid remains. The temperature of the material may have been raised to 80° to 100° C., the surface of the particles has softened so that the additives diffuse readily into the powder or granulate particles. The diffusion involves both, gaseous and liquid state of the additives and the high speed agitation which continues makes sure that the particles continue to remain separate and individual elements of the fluid and do not agglomerize while the additives can readily diffuse into the particles.

Friction and collision, of course, continue so that thermal action is maintained and the diffusion will be completed within a few minutes. Moreover, the additives become rather homogenically distributed, not only throughout the fluidized material as such, but also within each particle. The process thus is continued for a period which is known in advance, namely the time it takes for the additives to diffuse deeply into the particles and is more or less homogenically distributed therein. However, the agitation speed may have been reduced as it takes more mixing power and agitation to raise the temperature than to keep the temperature constant or approximately constant for diffusion. The continued agitation is needed to prevent the rather warm particles from clustering. Also, the gaseous phase should participate in the diffusion so that the maintaining of the fluidized bed is desirable throughout. Unlike the known methods, the particles are not just coated but impregnated thoroughly by the additives.

As outlined earlier, the additives which are caused to diffuse by the agitation process, have been mixed with and/or solved in the liquidous silane or silane compound which acts, therefore, as solvent for peroxide, activators, and anti-oxidant. The catalyst could be added to that solution, but its adding to the mixture is preferably deferred. These additives will therefore also diffuse into the particles of the fluidized polyethylene powder and the resulting homogeneity in the distribution will depend on the homogeneity of the mixture, bearing in mind that the agitation will also homogenize these additives even before diffusion begins.

The solution of additives could be added to the powder even prior to high speed agitation, even when the fluidized polyethylene is still cold. However, in order to obtain a rapid onset of diffusion, a high diffusion temperature and a large (initial) diffusion gradient should concur, so that the adding of the additives may be deferred until heating and/or agitation has raised the temperature to about 80° C. However, it will be appreciated that adding-while-agitating under vacuum is more complicated than charging the mixing vessel with the additives prior to agitation.

If one agitates at high speed within the stated range and causes diffusion at temperatures between 80° and 100° C., that process will be completed in 3 to 20 minutes. Since diffusion is an e-function process, little is gained by much longer agitation. Also, the finer the powder, the more rapidly does one obtain homogenic diffusion in the powdery polymer. The condensation catalyst could be added at that point, but that aspect shall be described later.

Upon completion of the agitation, an extruder 2 is charged with the content of the mixing vessel. The extruder 2 is of conventional variety and of the type used to extrude granular substances to jacket a cable or a tube. The cable or tube 3 to be jacketed thus runs through the extruder and a jacket is extruded around it. The extruder is operated at a temperature of the extruded material to be in the range from 160° to 250° C., preferably from 190° to 230° C. That extruder does not have to perform homogenization work. Therefore, one does not need special worms or screws which perform in parts mixing of the raw charge. The extruder (barrel) chamber is however, the location in which grafting occurs, just prior to jacketing the cable or tube.

The jacketed cable or tube 4 as it leaves the extruder passes, for example, through a spray device 5 by means of which the catalyst (for cross-linking) is applied. Thus, in this form of practicing the invention the catalyst is not part of the additives. The catalyst is therefore in contact with the silane for a minimum period of time, just ahead of the cross-linking. This way, the speed of cross-linking once initiated by application of moisture is rather high.

The cable is subsequently wound on a drum 6 which may be finally placed into a tank of water, 7, and stays therein for a period sufficient for the water to diffuse into the envelope so as to obtain cross-linking. The water in tank 7 may have an additive which reduces the surface tension of the water, so that it can readily creep and flow into all the voids and spaces between the loops, and particularly in lower lays of the elongated stock as wound on drum 6. It should be noted, however, that dipping of the jacketed product into water may not be necessary in some cases as will be explained later.

As outlined above, the catalyst can be sprayed onto the extruded jacket. As a general rule, the catalyst should be applied subsequent to the diffusion of the silane solution into the polymer powder particles. If, as is basically feasible, the catalyst is one of the additives for the silane solution, the process is simplified, but since the catalyst is the prime factor in determining speed of cross-linking, some premature cross-linking is invited. Thus, it is in fact preferred to keep the catalyst separated from the silane solution and to add the catalyst after the diffusion of silane has been completed. Upon spraying the catalyst onto the extruded jacket, it is actually applied even after grafting. That, however, is not necessary. A further alternative of applying the catalyst to the principle mixture is by spraying it into the hot mass inside of the extruder.

In accordance with the preferred form of practicing the invention, one proceeds as follows regarding the adding of the condensation catalyst. A batch is produced in which the powdery polymer must have the same consistency as the polymer used for diffusion with silane. The polymer to be impregnated with catalyst must be at least compatible with the polymer with diffused silane. If the latter is polyethylene, the former should be for example wax, a polyethylene with different Mol weight, an ethylene mixture polymerisate or polyolefin such as isobutylene or polyisobutylene. This polymer is now mixed with the catalyst as a ratio of 100 parts polymer (e.g. polyethylene) to 0.5 to 10 parts (by weight) of catalyst. Preferably one produces a 1% polymer-catalyst (dry) fluid. Preferably one will use dibutylin dilaurate as catalyst.

Agitation and/or heating may raise the temperature also here, but only to about 60° to 100° C. to enhance diffusion of the catalyst into the polymer particles. However, room temperature may suffice. If the catalyst diffuses at elevated temperature, that subprocess is completed within a few minutes, and this particular powder is also available now as a fluidizable batch.

This polymer plus catalyst batch can be blended with the polymer plus silane batch in the mixing chamber used for the latter, as the last phase of fluidization and agitation thereof. The catalyst and the silane have actually minimal contact here. Alternatively, one can charge the extruder with the two different batches, but preblending is preferred.

It should be noted, that the catalyst-to-polymer-to-silane ratio can be particularly accurately metered if two batches are prepared in the stated manner. Of course, the adding of the thermoplastic through the catalyst batch has to be considered upon determining the total ratios and precentages of the various additives.

DESCRIPTION OF DETAILS

After having described the process layout and equipment for implementation, we proceed to the description of details, particularly regarding materials involved. It was found advantageous to use as principle thermoplastic material higher-molecule polyethylene with a melting index of about 2 (MI 2). Employment of this particular material has the advantage that the amount of silane-peroxide needed can be rather small. Moreover, upon making a cross-linking jacket as outlined above there is comparatively little danger that the core (3) will assume an excentric disposition in the jacket and also dripping and dropping of the material at grafting temperature of, say 200° C. is avoided. If the melting viscosity is too low, bubbles could appear upon decompositioning of the peroxide into a gaseous residue. For this particular reason one wants to use as little peroxide as possible and here particularly the employment of 1,3-bis(tert. butyl peroxi-isopropyl) benzene. The utilization of peroxide can be reduced further if one uses poly-functional monomers such as divinyl benzene, triallyl cyanurate or methacrylate. The yield in radicals is increased while formation of decomposition products is minimized. It is additionally of advantage regarding the grafting, if one uses an additive that traps methyl-radicals without, however, reducing the total yield in production of radicals. One can use here higher condensated aromates such as anthracene, phenanthrene, naphthyleneethylene and its derivatives and at a proportion such as 0.2 to 3.0 parts by weight per 100 parts polyethylene.

The base polymer may be supplemented by EPDM (ethylene-propylene-Ter polymer elastomer (rubber)) or by EPM (ethylene-propylene-elastomer). These rubber compounds can be added to the principal polymer, such as 5 to 20 parts for 100 parts polymer, so as to increase the melting viscosity thereof. Again, this is another way of reducing the possibility of formation of bubbles in the extruded product.

A number of organic silane compounds are known having an unsaturated organic substitute such as vinyl, allyl, etc. and hydrolizable alcoxy or ester groups at the Si atom. Presence of an unsaturated organic substitute is the prerequisite of grafting silane upon the molecules of the principle polymer. On the other hand, the speed of cross-linking in the presence of water, with or without catalyst, is determined by the sensitivity to hydrolysis of the alcoxy or ester groups, i.e. the change of the latter into a silanol group. It is known that vinyl-triacetoxy silane changes rather rapidly, even in the presence of mere traces of $H_2O$. This high speed hydrolysis makes it possible to obtain cross-linking at reasonable speed without catalyst and even without submersion into water. The silane compounds are added in a proportion of 0.5 to 10 parts silane per 100 parts by weight base polymer (e.g. polyethylene).

The known methods for cross-linking organic polymerisates by means of grafting silane compounds work with peroxides or other substances furnishing the needed radicals so that grafting can in fact be induced. Most of the peroxides, however, particularly the ones usually employed such as dicumylperoxide (DCP) have a high cross-linking effectiveness, i.e. the C-C cross-linking is not sufficently surplanted by grafting. That in turn renders working of the plastic difficult. The invention, however, suggests utilizing a peroxide with a low cross-linking effectiveness, for obtaining the desired grafting. For example, one should use an ester peroxide such as tert.butyl peroxyneodecanoate; tert.butyl peroxypivalate, tert.butyl peroxy-2-ethylhexanoate or tert-.butyl peroxy-benzoate. All of these ester peroxides furnish radicals upon decomposing thermally; they have only little cross-linking effectiveness, but they do induce the grafting. The preferred grafting inducing additive in accordance with the invention is tert.butyl-peroxy-isonanoate which is added at 0.05 to 0.5% (by weight) in relation to the principle fluidized polymer. One can use also a peroxide blend as grafting initiators, for example a mixture of 1,3-bis(tert.butylperoxy-isopr-pyl)benzene and tert.butyl peroxiisonanoate. (i.e. tert-.butylperoxy-3,35-trimethylexanoate).

As anti-oxidant one may use the monomer or an oligomer of the 2,2,4-trimethyl-dihydroquinoline. This type of anti-oxidant can readily be grafted onto polyethylene pursuant to the radical reaction just like the silane. These compounds contain a rather reactive C-C double bond permitting grafting upon the hydrocarbon chain of the respective polymer. The stabilizer molecule fixed in this manner to the macromolecule of the high polymer cannot migrate nor volatilize, but provides permanent protection against oxidation. Such anti-oxidants are for example substances traded under the designation Anox HB; Flectol H and Agerite resin D. One can also use here monomer derivatives of quinoline such as 6-ethoxi-2,2,4-trimethyl dihydroquinoline (also called Santoflex AW) or the 6-dodecyl-2,2,4-trimethyl dihydroquinoline (also called Santoflex DD). These last mentioned substances have the advantage that they are liquidous at room temperature and readily diffuse into the granulated polymer particles.

Adding any such substance to the silane and to the other additives actually improves the chemical reaction of grafting and, of course, one obtains stabilization against oxidation. This is particularly so as these oxidants are more homogeneously introduced into the material by operation of the principle feature of this invention. As stated above, any concurring C-C cross-linking is undesired, particularly when occurring prior to extrusion. One way of suppressing this cross-linking is to de-activate these C-radicals which have been produced on the polyethylene chain during grafting but which did not receive a silane molecule. This deactivating may be produced by a regular hydrogen transfer or by adding (grafting) an anti-oxidant to that reaction point. The C-C cross-linking generally occurs at a slower speed than both the speed of de-activating as well as the speed of grafting, so that this particular way of avoiding undesired C-C cross-linking is indeed effective. One uses here from 0.05 to 2.0 parts by weight per 100 parts of the principle polymer, preferably however less than 0.5 parts by weight.

As stated above, one will use as one of the additives to the silane an activator such as a polyfunctional monomer, e.g. triallyl cyanurate, divinylbenzene, ethylendimethycrylate, triallyl phosphite or others. These activators are added at an amount of 0.01 to 10 parts by weight per 100 parts by the principle polymer.

As silane or a silane compound is grafted upon the macromolecules of polyethylene, the melting index drops rather rapidly, i.e. the properties relating to the fluidity of molten polyethylene deteriorate by virtue of the grafting. However, extrusion is still possible. The significant drop of the melting index results from the impediment the macromolecules of the polyethylene have incurred by virtue of the grafting. That in turn diminishes the ability of the material to undergo relaxation following forming. If for example a hose is extruded as outlined above, the chain molecules will be rather strongly oriented, and impeded relaxation leads to internal strain because of the orientation so that the mechanical properties e.g. strength of such a jacketing hose may prove inadequate. Thus, the melting index should not drop too much on account of the grafting. By way of example, one can use lower molecular polyethylene having for example $MI > 2$. Another remedy is the utilization of extrusion tools which do not provide for a significant orientation of the extrudate. Also, the exit temperature of the extruded material could be as high as possible to enhance fluidity while the extrusion can be carried out further under minimal stretching of the hose as it is withdrawn e.g. by virtue of the passing through tube or cable core 3.

Still of advantage here is a preheating of the conductor and a stepwise i.e. graduated cooling of the jacketed product. In other words, quenching should be avoided. All these measures avoid excessive dropping of the melting index.

As already stated above, if one uses a tank 7 into which the extruded product is immersed for obtaining cross-linking it may be advisable to add a substance to the water which reduces surface tension while enhancing cross-linking. For example, if the jacketed cable or tube is wound on drum 6 in multiple lays access to the inner lays is difficult. Particularly if the water contains also catalyst, reducing the surface tension will more easily wet the cable surface, and water will more easily enter the space between the loops of the coiled cable and particularly here the inner layers. Unfortunately, this method still does not permit adequate control of the amount of moisture that penetrates by diffusion into the insulation.

A certain degree of control regarding the water that will be effective in the interior of the cross-linking plastic is obtained in the following manner. Generally speaking, the speed of cross-linking in the presence of water depends on the amount of catalyst made available and or the water temperature. The maximum degree of cross-linking obtained depends exclusively on the amount of grafted silane or silane compound and on the distribution of the active or activatable (unsaturated) silane branches. Now it should be considered that for example siloxane cross-linking has a unique reaction mechanism because it is a silanol condensation reaction wherein $CH_3OH$ and $H_2O$ is released. Thus, one needs only little water to start the reaction which becomes self-sustaining. The water as it is being used up is continuously replenished as a result of the silanol condensation reaction. The product such as a cable or tube etc. jacketed as described, does not have to remain in the water tank while cross-linking has been completed. Just about 10 minutes or thereabout suffices, and thereafter one can remove the cable or tube from the tank. The cross-linking once initiated proceeds now of its own accord. Thus, in lieu of a tank 7 as shown in the FIGURE, it may be sufficient to pass the jacketed cable through a water trough, just to get cross-linking started which will proceed while the cable or tube is wound on drum 6 and stored dry. Conversely, if not sufficient water is released by internal reaction (see also the following paragraphs) temporary storage in or passing through water for a relatively short period of time may be desirable to add additional water by diffusion.

Another way of controlling the amount of water that is effective on the inside of the grafted polymer is the following. Among the additives for the principal polymer powder one should include a compound which releases water or hydrogen. This is to be understood generally; the release may be a chemical or physical one but should occur only under specific conditions, such as high temperatures. Not only can the amount of water needed be stoichiometrically determined, but the specific process step of immersing the product in water may actually be omitted entirely. The water is developed within the plastic and does not have to be diffused into the plastic in a separate process.

The number of points or branches for cross-links in a thermoplastic material, particularly when established by grafting, can be rather accurately predetermined so that the stoichiometric conditions for the cross-linking i.e. the amount of water needed is correspondingly quantitatively predeterminable. Thus, upon using additives which release water, the amount of such additives needed is likewise an ascertainable quantity. The specific quantity for such additive depends on its molecular weight to release the needed amount of water molecules. Thus, one may need 0.05 to 5 parts by weight of the water yielding additives per 100 parts of the principle polymer. Since in some cases percentages as low as 0.05 suffice, one has an additional cost advantage here.

Actually, in specific cases (namely when cross-linking is chemically a condensation reaction of silanol) one $H_2O$ molecule is produced per cross-link (not of the water releasing additive). This $H_2O$ will by itself cause another cross-linking reaction etc. Therefore, the water to be released from an additive is need in catalytic quantities only. The rest of the water needed for condensation cross-linking is produced by the silanol reaction as was outlined above also with reference to the siloxane cross-linking process.

It is of particular advantage if the additive that yields water will release $H_2O$ molecules at relatively high temperatures only, for example at the end of the grafting process (i.e. in the hottest part of the extruder, just before ejecting the extrudate). Also, one can provide these additives to the graft polymer together with or in the catalyst-polymer batch.

Particular water releasing additives of interest are for example anorganic compounds such compositions containing hydrate water e.g. aluminum oxide-hydrate, gypsum or the like. Some organic materials are known which will release water at particular temperatures and are, therefore, suitable for the purposes of this invention. For example, one can use here cyclohexandionsimihydrate or structure-analogous compounds. One can also use short chains of polyvinyl alcohols such as oligomers of vinyl alcohol or beta-hydroxycarbon acids, gamma-hydroxycarbon acids or derivatives of these acids.

Generally speaking, one can use here any condensation reaction, i.e. a reaction between two components A and B which results in a indifferent substance C and water, wherein the requirement of indifference is to mean that the substance does not affect detrimentally the cross-linking nor does it cause deterioration of the desired properties of the resulting extrudate. Compounds such as free fatty acids and metal salts thereof can be used. It should be noted here that these components are known to serve as cross-linking catalysts, and they can also serve as catalyst, as defined above, for the internal production of water at particular temperatures. They have, therefore, a dual function in this case.

The silane-grafted polyethylene which contains water yielding additives is extruded in 2 as a regular thermoplastic material. The extrusion temperature can be selected so that the dehydrating temperature is just being reached or only briefly exceeded. As a consequence, water is produced internally as a result of one of the chemical reactions as outlined above, and cross-linking will now proceed under influence of the previously added or sprayed-on catalyst. It should be noted, that any internally developed $H_2O$ is molecularly dispersed and evenly distributed throughout the extrudate, so that cross-linking points are formed everywhere. Diffusion of the catalyst from the outside results in a less homogenic distribution, because diffusion is easier into amorphous material than into crystalline structure. Consequently, cross-linking is obtained more homogeneously throughout when the water is internally developed which is of great advantage for the electrical and mechanical properties of the cable.

If catalysts are missing entirely in the extruded mixture, cross-linking by operation of released water is slower, and takes ten to twenty times longer than with catalyst. Thus, in the absence of a catalyst a piece of plastic will cross-link completely in about thirty to eighty hours. However, one has to consider that a jacketed cable is not completed following extrusion. One may have to wind a layer of ribbon around it, provide a shield and an additional jacket etc. All these process steps take some that so that upon completion, including final testing, a period of time sufficient for cross-linking has in fact elapsed and cross-linking is completed without catalytic speed up. The cross-linking density is not dependent on the presence of a catalyst; a catalyst controls merely the speed of that process. Also, the final cross-linking density is not dependent on the amount of water that was released. The sole criterium is the amount of grafted silane.

As mentioned above, one can use hydroxycarbon acids as material from which to derive the water. If one uses a derivative of beta-hydroxycarbon acid, one obtains acrylacid derivatives in accordance with the equation

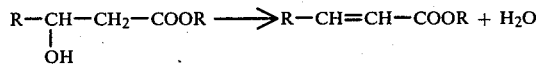

These derivatives are structurally related to cross-linking activators known as Sartomer types and pertaining to the group of methacrylic acid ester. Utilization of this material offers the further advantage that not only can the amounts of water needed be metered quite accurately, but one obtains a cross-linking activator so that one needs less peroxide.

EXAMPLES

After having described the metes and bounds of the method in accordance with the invention, we shall describe several specific examples, denoted I, II and III.

EXAMPLE I

The mixture, ultimately produced consisted of the following components (% - by weight)

| | |
|---|---|
| polyethylene (MI-8) | 100% |
| 2,2,4 trimethyl-dihydroquinolin | 0.5% |
| tert.-butylperoxi-isonanoate | 0.2% |
| 1,3 bis (tert.-butylperoxi-isopropyl benzene) | 0.02% |
| vinyltrimethoxisilane | 2.6% |
| triallylcyanurate | 0.1% |
| 1%-dibutyltindilaurate in polyethylene batch | 5.0% |

The mixture was obtained as follows. One prepared a solution with vinyltrimethoxisilane as solvent and included all additives except the dibutyltindilaurate. This solution was added at appropriate quantity to 14.25 kilograms polyethylene as fluidized in a dry mixer and under 1700 RPM. As the temperature rised to 95° C. the rotation and agitation was reduced to 650 RPMs. Actually, all the diffusion was completed at that point. Subsequently, the mixer was cooled in water so that the temperature dropped to 70° C. whereupon 750 g of the 1% dibutyltindilaurate in a polyethylene batch was blended into the mixture. The resulting composition was filled in PE bags for storage.

The 1%-batch had been prepared separately. For this, 14.85 kilograms granulated polyethylene was mixed in the or a dry mixer with 0.15 kilograms of dibutyltindilaurate at 1700 RPMs and for about 2 to 5 minutes. The dibutyltindilaurate diffused rather quickly into the polyethylene so that after about 5 minutes the agitation speed could be reduced to 650 RPM under cooling of water. This catalyst batch was thus prepared as fluidizable powder and it was added and blended with the polyethylene-silane batch at the stated quantity.

An extruder with a worm or screw of 45 mm length and an L/D ratio of 20 was used to extrude the powder blend. The temperatures were adjusted for extruder zones 1, 2, 3 and 4 to be respectively 160° C., 180° C., 210° C. and 230° C. The extrusion head and the mouth had the same temperature of 230° C.

The temperature of the extrudate was about 220° C. and dwell time in the extruder was about 2.5 minutes for 25 RPMs of the screw. That period sufficed to complete the grafting to the desired degree.

The smooth extrudate had a melting index in accordance with ASTM D 1238-57T of 0.5 grams/10 min. The degree of cross-linking in accordance with the solvent extraction test, method IEC, was 70% after 2 hours cross-linking time in 100° C. water.

EXAMPLE II

| | |
|---|---|
| polyethylene (MI-8) | 100% |
| 2,2,4 trimethyl-dihydroquinoline | 0.5% |
| tert.-butylperoxi-isonanoate | 0.12% |
| 1,3-bis (tert.-butylperoxi-isopropyl)benzene | 0.04% |
| triallyl-cyanurate | 0.06% |
| vinyltrimethoxisilane | 2.6% |
| dibutyltindilaurate | 0.05% |

Again, all additives except dibutlytindilaurate were solved in the -silane, and the solution was added to 15 kilograms polyethylene granulate and mixed at 1700 RPM to obtain diffusion. After reaching a temperature of 95° the agitation speed was reduced to 650 RPM and the mixture was water cooled whereupon the batch with 12.5 grams dibutyltindilaurate was added and blended. That batch had been prepared as described in Example I. After about 5 minutes blending the fluidized granulate was filled in polyethylene bags and processed after cooling. The extrusion was carried out also as described in Example I. The smooth extrudate had a melting index of 0.03 g/10 min. After 2 hours of cross-linking in water at 100° C., the degree of cross-linking (gel portion) was 72%.

EXAMPLE III

| | |
|---|---|
| polyethylene (MI-2) | 100% |
| 2,2,4 trimethyl-dihydroquinoline | 0.5% |
| tert.-butylperoxi-isonanoate | 0.23% |
| triallylcyanurate | 0.18% |
| vinyltrimethoxisilane | 2.5% |
| dibutyltindilaurate | 0.05% |

In this case all additives (including the dibutyltindilaurate) were solved in the silane, and the solution was mixed with 15 kg polyethylene at 1700 RPM. After the temperature had risen to 95° C. the agitation speed was reduced to 650 RPM and the mixture was cooled. After 5 to 10 minutes the still fluid granulate had a temperature of 70° C. and was filled in bags. 60 kg mixture were made in that fashion and then worked in a 90 mm long extruder screw at a 20 L/D ratio. The temperatures in the extruder were 160° in zone 1 and 220° in zones 2, 3, 4 as well as in the flange. Head temperature was 275° C. and mouth temperature was 235° C. The extruded mass had temperature of 220° C.

The electrical cable made in that manner has a core of multiple tin plated, copper strands with total cross-section of 70 mm². The extruder speed was 28 RPM at a withdrawal rate of 18 meters per minute. The dwell time of the material in the extruder was 2.5 minutes and the wall thickness of the jacket was 1.4 mm.

The jacket was cross-linked for 2 hours in water of 100° C. and the resulting degree of cross-linking was 68%. The hot-set value for 150° C. and 20 N/cm² load was 75% extension. After removal of the load the residual extension was 0%.

The following mechanical properties were measured. Tensile strength 17.0 N/mm², module of elasticity 50% 10.5 N/mm². The elongation at rupture was 490%. After aging for 7 days at 150° the tensile strength was still 16.0 N/mm² and elongation at rupture was still 410%.

The invention is not limited to the embodiments described above but all changes and modifications thereof not constituting departures from the spirit and scope of the invention are intended to be included.

We claim:

1. In a method for cross-linking thermoplastic or elastomeric material wherein cross-linking is preceded by grafting of silane and is carried out in the presence of moistures, the combination of steps comprising:
    providing the thermoplastic or elastomeric material as dry, fluid powder;
    agitating the powder to obtain fluidization thereof and raising the temperature by operation of the agitating;
    adding a silane compound to the material prior to completion of the agitation, the silane compound being of the variety that permits grafting on the molecules of said powder;
    providing for a temperature below the crystallite melting range, between 80° C. and 100° C., so that the silane or silane compound as agitated together with the said material fluid is caused to diffuse into the fluid particles without grafting; and
    providing for grafting of the silane or silane compound molecules to the molecules of the thermoplastic or elastomeric material.

2. In a method as in claim 1, wherein the silane compound is added at a temperature below the crystallite melting range of the said powder.

3. In a method as in claim 1, wherein the silane is added at a temperature between 60° and 100° C.

4. In a method as in claim 1, wherein the grafting occurs with mechanical-thermal treatment of the powder.

5. In a method as in claim 4, wherein said treatment is carried out at a temperature between 160° and 250° C.

6. In a method as in claim 4, wherein the powder is extruded.

7. In a method for cross-linking thermoplastic or elastomeric material, wherein cross-linking is preceded by grafting of silane and is carried out in the presence of moistures, the combination of steps comprising:
    providing the thermoplastic or elastomeric material as a dry, fluid powder;
    agitating the powder to obtain fluidization thereof and raising the temperature by operation of the agitation;
    adding a silane compound to the material prior to completion of the agitation, the silane compound being of a variety that permits grafting on the molecules of said powder;
    providing for a temperature below the crystallite's melting range, so that the silane or silane compound, as agitated, together with the said material fluid is caused to diffuse into the fluid particles without grafting; and
    subjecting the material to a high energy radiation for grafting the silane or silane compound molecules upon the molecules of the thermoplastic or elastomeric material.

8. In a method as in claim 7 wherein the material has a temperature below 180° C. during said radiation.

9. In a method as in claim 1 wherein the silane compound is added to the powder prior to agitation.

10. In a method for cross-linking thermoplastic or elastomeric material, wherein cross-linking is preceded by grafting of silane and is carried out in the presence of moistures, the combination of steps comprising:
    providing the thermoplastic or elastomeric material as a dry, fluid powder;
    agitating the powder to obtain fluidization thereof and raising the temperature by operation of the agitation;
    adding a silane compound when the temperature of the powder has risen to 60° C. to 100° C. prior to completion of the agitation, the silane compound being of a variety that permits grafting on the molecules of said powder;
    providing for a temperature below the crystallite's melting range, so that the silane or silane compound, as agitated, together with the said material fluid is caused to diffuse into the fluid particles without grafting; and
    providing for grafting of the silane or silane compound molecules on the molecules of the thermoplastic or elastomeric material.

11. In a method as in claim 1 or 10 wherein the silane compound is added when the temperature of the powder has risen to 80° to 90°.

12. In a method as in claim 1, and including pre-drying the powder before adding the silane compound.

13. In a method as in claim 1, wherein the silane compound is added to the powder under conditions of low pressure to obtain evaporation.

14. In a method as in claim 13, wherein the diffusion occurs from the liquidous as well as from the gaseous phase of the silane compound.

15. In a method as in claim 1, wherein the mixture is formed and subsequently placed in intimate contact with water.

16. In a method as in claim 15, and including adding to the water a substance which reduces surface tension.

17. In a method as in claim 1, wherein the silane compound is mixed with peroxide.

18. In a method as in claim 17, wherein the silane compound is additionally mixed with an activator.

19. In a method as in claim 17, wherein the silane compound is additionally mixed with an anti-oxidant.

20. In a method as in claim 1, wherein a condensation catalyst is added to the mixture subsequent to diffusion.

21. In a method as in claim 20, wherein the condensation catalyst is added under temporary continuation of the agitation.

22. In a method as in claim 20, wherein the mixture is extruded, the catalyst being added to the hot mixture as it is being extruded.

23. In a method as in claim 20, wherein the mixture is applied to an elongated object, the catalyst being sprayed on.

24. In a method as in claim 20, wherein a batch of the powder and of the catalyst is prepared to obtain diffusion of the catalyst into the latter powder and adding the batch as mixed to the mixture.

25. In a method as in claim 1, wherein the silane compound is mixed with a anti-oxidant.

26. In a method as in claim 25, wherein the oxidant is a monomer or oligomer of the 2,2,4 trimethyl-dihydroquinoline.

27. In a method as in claim 25, wherein the oxidant is also grafted onto the polymer.

28. In a method as in claim 1, wherein 0.05 to 0.5 parts per 100 parts (by weight) of powder, of a peroxide is added to the silane as solution therein.

29. In a method as in claim 28, wherein the peroxide is an ester-peroxide.

30. In a method as in claim 29, wherein the esteroxide is tert.-butylperoxy-isonanoate.

31. In a method as in claim 28, wherein the peroxide is a blend of 1, 3 bis(tert.-butylperoxy-isopropy) benzene and tert.-butylperoxy-3,3,5-trimethylhexanoate.

32. Method as in claim 1, wherein the silane compound is vinyltriacetoxy silane.

33. Method as in claim 1, wherein the fluid is higher molecular polyethylene with a melting index of about 2.

34. Method as in claim 1, and including mixing the fluidizable polymer with higher condendated substances.

35. Method as in claim 1, and including mixing the fluidizable polymer with ethylene propylene terpolymer elastomer or ethylene-propylene elastomer at 5 to 20 parts by weight per 100 parts fluidizable polymer.

* * * * *

UNITED STATES PATENT AND TRADEMARK OFFICE
CERTIFICATE OF CORRECTION

PATENT NO. : 4,289,860
DATED : Septemner 15, 1981
INVENTOR(S) : Hermann U. Voigt It is certified that error appears in the above—identified patent and that said Letters Patent is hereby corrected as shown below:

On The Title Page, after item (19) "Glander et al." should read -- Voigt --;

item (75) should read

-- (75) Inventor: Hermann U. Voigt,

Langenhagen, Fed. Rep. of

Germany --.

Signed and Sealed this

Twentieth Day of July 1982

[SEAL]

Attest:

GERALD J. MOSSINGHOFF

Attesting Officer

Commissioner of Patents and Trademarks